United States Patent
Mitter

(10) Patent No.: US 7,188,207 B2
(45) Date of Patent: Mar. 6, 2007

(54) COMMUNICATION DEVICE HAVING ASYNCHRONOUS DATA TRANSMISSION VIA SYMMETRICAL SERIAL INTERFACE

(75) Inventor: Carsten Mitter, Wahlsburg (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 10/799,379

(22) Filed: Mar. 12, 2004

(65) Prior Publication Data

US 2004/0225761 A1 Nov. 11, 2004

(30) Foreign Application Priority Data

Mar. 13, 2003 (DE) ................................ 103 11 395

(51) Int. Cl.
*G06F 13/40* (2006.01)
*G06F 13/42* (2006.01)

(52) U.S. Cl. ...................................... 710/305; 710/106

(58) Field of Classification Search ...................... None
See application file for complete search history.

(56) References Cited

U.S. PATENT DOCUMENTS

| 6,291,905 B1 * | 9/2001 | Drummond et al. ........ 307/10.1 |
| 6,654,351 B1 * | 11/2003 | Casey ........................ 370/252 |
| 6,659,512 B1 * | 12/2003 | Harper et al. ............... 257/777 |

2003/0100980 A1 * 5/2003 Gruenewald et al. ......... 701/36

FOREIGN PATENT DOCUMENTS

DE 10306102 A1 * 9/2004
WO WO 9830415 A1 * 7/1998

* cited by examiner

*Primary Examiner*—Paul R. Myers
*Assistant Examiner*—Ryan Stiglic
(74) *Attorney, Agent, or Firm*—Kenyon & Kenyon LLP

(57) ABSTRACT

A communication device having asynchronous data transmission via a symmetrical, serial interface is described, having a microcontroller that exhibits a CAN controller and an asynchronous serial interface unit for receiving, processing, and outputting data; an asynchronous serial interface driver device for providing an asymmetrical data exchange with the microcontroller via the asynchronous serial interface unit, an asynchronous serial interface receiving line, an asynchronous serial interface transmitting line, and an external asynchronous serial interface port; a CAN driver device for providing a symmetrical data exchange with the microcontroller via the CAN controller, a CAN receiving line, a CAN transmitting line, and two external CAN ports; a connecting device between the CAN receiving line and the asynchronous serial interface receiving line, as well as between the CAN transmitting line and the asynchronous serial interface transmitting line for providing a symmetrical data exchange with the microcontroller via the asynchronous serial interface unit, the CAN driver device and the external CAN ports.

10 Claims, 2 Drawing Sheets

COMMUNICATION DEVICE HAVING ASYNCHRONOUS DATA TRANSMISSION VIA SYMMETRICAL SERIAL INTERFACE

FIELD OF THE INVENTION

The present invention relates to a communication device having asynchronous data transmission via a symmetrical serial interface, and in particular a motor vehicle control unit having an appropriate symmetrical serial data exchange interface.

BACKGROUND INFORMATION

The data volume in control units to be transmitted is subject to a constant increase. In particular in the automobile sector, the data exchange and communication interfaces common in this sector, such as CAN (controller area network), or K-Line (ISO9141) rapidly form the limiting component in the transmission path. In implementation 2.0b, for example, a CAN bus may offer a high baud rate, but because of the large overhead for plausibility checking, the effectively achievable data transmission rate is comparatively low.

In asynchronous interfaces such as SCI (serial communication interface) or UART (universal asynchronous receiver/transmitter), the effectively achievable baud rate is exposed or subject to narrow physical boundaries because of the asymmetrical signal transmission. If these boundaries are exceeded, the bit error rate (BER) noticeably increases due to breakdown, and error-free signal transmission is no longer possible. This in turn reduces the transmission rate. This applies to "single-wire" interfaces having an individual, alternately used transmitting and receiving line (half duplex) such as the ISO-K-Line (ISO9141) or LIN (local interconnect network) common in motor vehicles, as well as to "two-wire" interfaces having separate transmitting and receiving lines (full duplex) such as a UART (universal asynchronous receiver/transmitter) or an RS232 interface.

SUMMARY OF THE INVENTION

The control device according to the present invention having a communication device having asynchronous data transmission via a symmetrical serial interface has the advantage, in relation to the known approaches to the object, that an increase in the transmission rate as well as the transmission reliability of serial asynchronous interfaces in control devices, preferably control units in motor vehicles, is provided.

Thus, for instance, in comparable data rates for ISO9141, increased transmission reliability is achieved, allowing greater line lengths for the connection. In an identical network topology, a much higher data rate is possible. The use of a control device according to the present invention is in particular advantageous in areas where large amounts of data are to be transmitted within a short period, such as in flash programming.

The present invention is essentially based on the idea that, by connecting a CAN interface driver with a serial communications module of a microcontroller, a greatly increased effective data transmission rate and/or longer line lengths of the connecting lines are implemented due to the symmetrical signal transmission. Existing control unit hardware may be used here, meaning that new hardware is not necessary for the same number of lines. A further advantage is that when simultaneous use of the asynchronous symmetrical interface and the CAN interface is not necessary, the driver stage of the asynchronous symmetrical interface may be omitted. Consequently, other external components, such as external lines and contact pins, may be omitted, if necessary.

In other words, a communication device having asynchronous data transmission using a symmetrical serial interface is provided, having a microcontroller that exhibits a CAN controller having a CAN interface and an asynchronous serial interface unit for receiving, processing, and outputting data; an asynchronous serial interface driver device for providing an asymmetrical data exchange with the microcontroller via the asynchronous serial interface, an asynchronous serial interface receiving line, an asynchronous serial interface transmitting line, and an external asynchronous serial interface port; a CAN driver device for providing a symmetrical data exchange with the microcontroller via the CAN interface, a CAN receiving line, a CAN transmitting line, and two external CAN ports; a connecting device between the CAN receiving line and the asynchronous serial interface receiving line, as well as between the CAN transmitting line and the asynchronous serial interface transmitting line for selectively providing a symmetrical data exchange with the microcontroller via the asynchronous serial interface, the CAN driver device and the external CAN ports.

According to a preferred refinement, the connecting device has a switching device, which is selectively controllable via an external pin of the control device or via an internal port of the microcontroller depending on a program control. A selectively controllable coupling device between the CAN interface driver and the asynchronous serial interface is consequently advantageously provided, which is switchable either from outside or by the microcontroller itself.

According to another preferred refinement, the program control is configured such that data may be received or transmitted only through one interface at a time. In this way, it is advantageously ensured that a receiving and transmitting mode is activated, avoiding a breakdown of the signal or damage to the transmitting phases in transmitting mode.

According to another preferred refinement, the connecting device is made up of resistance bridges, paste resistors that may be lasered through, or bond wires. This has the advantage of an economical implementation of the connecting device, which, however, provides a static connection and is not controllable.

According to another preferred refinement, data exchange between an external device and the control device is task- or interrupt-controlled. Because of this, the connecting device may not be switchably connected in an advantageous manner via a permanent connection when the data exchange does not run parallel in time but in a staggered manner, which is typically the case for control units in automotive applications.

According to another preferred refinement, the connecting device is provided within the microcontroller. The advantage therein is that a separate physical connecting device need not be generated in the control unit. The setting required each time is controlled through internal registers or memory locations of the microcontroller and is flexibly configurable through software.

According to another preferred refinement, the microcontroller has one pin each for the asynchronous serial interface transmitting line and the asynchronous serial interface receiving line, as well as for the CAN transmitting line and the CAN receiving line, and the connecting device that in each case connects the transmitting lines as well as the receiving lines within the microcontroller. Isochronous data exchange is consequently advantageously facilitated via the asynchronous serial interface and CAN interface.

According to another preferred refinement, the microcontroller has a common pin for the CAN receiving line and the asynchronous serial interface receiving line as well as a common pin for the CAN transmitting line and the asynchronous serial interface transmitting line, the selection of the desired interface being implementable via a register setting. This results in a reduction in the size of the microcontroller, the necessary interface multiplexing CAN/SCI being facilitated via the register setting. An isochronous data exchange via the asynchronous serial interface as well as via the CAN interface is not possible for such a control device.

DETAILED DESCRIPTION

In the Figures, the same reference numbers refer to the same components or those with similar functions.

Figure 1:
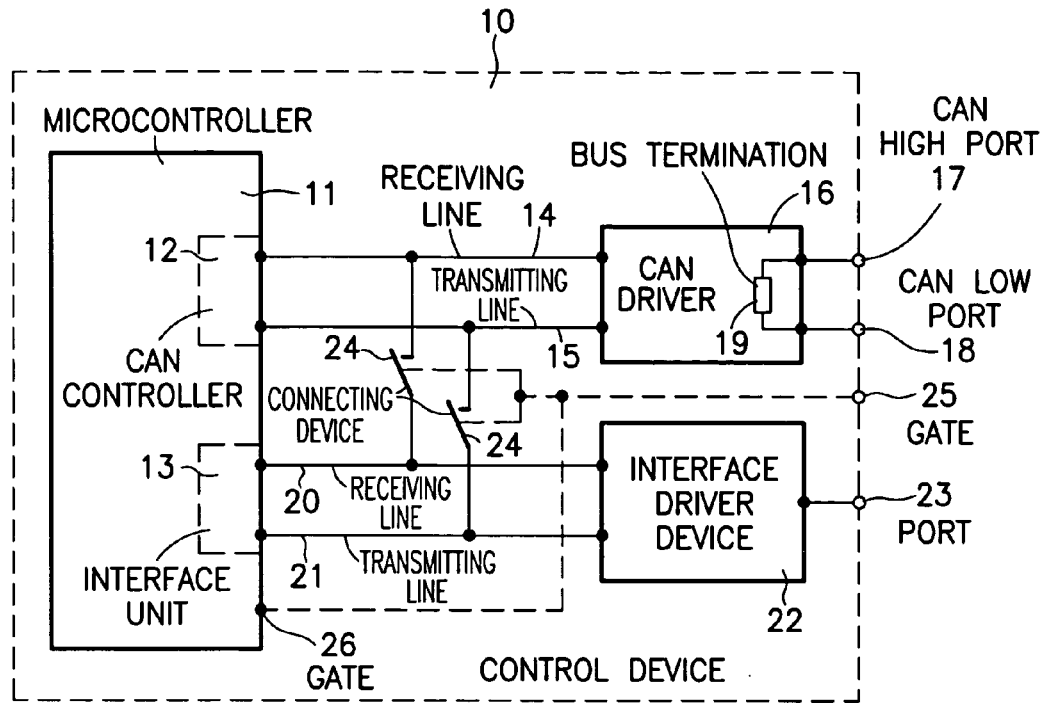
FIG. 1 shows a schematic block diagram of a control device to explain an embodiment of the present invention.

Schematically illustrated in FIG. 1 is a control device 10, which has a microcontroller 11. Microcontroller 11 has a CAN controller 12 and an asynchronous serial interface unit 13. CAN controller 12 is connected via a receiving line 14 and a transmitting line 15 to a CAN driver device 16, which in turn has a CAN high port 17 and a CAN low port 18. Through both CAN ports 17, 18, data may be fed to or read from CAN driver device 16 and consequently via CAN controller 12 fed to or read from microcontroller 11. A bus termination 19, for example, a resistor, is optionally provided between CAN high port 17 and CAN low port 18 within CAN driver device 16.

Asynchronous serial interface unit 13 of microcontroller 11 is connected via an asynchronous serial interface receiving line 20 and an asynchronous serial interface transmitting line 21 to an asynchronous serial interface driver device 22, which through an external asymmetrical port 23 facilitates data exchange between an external device (not illustrated in FIG. 1) and control unit 10, i.e., microcontroller 11, within control unit 10. A connecting device 24 is provided between CAN receiving line 14 and asynchronous serial interface receiving line 20, likewise between CAN transmitting line 15 and asynchronous serial interface transmitting line 21. The preferably selectively controllable connecting devices 24 are operable from outside, for example, via a gate 25 and/or via a gate 26 within the microcontroller. The external, asymmetrical port 23 may be a single-wire interface having alternately used, combined transmitting/receiving line (half duplex) as well as a double-wire interface having separate transmitting and receiving lines (full duplex).

Such a circuit design in accordance with FIG. 1 represents a symmetrical asynchronous serial interface (for example, SSCI: symmetric serial communication interface), the components necessary thereto, such as microcontroller 11 having microcontroller interface units 12, 13 and corresponding driver devices 16, 22, making up the standard components, for example in motor vehicle control units. Connecting device 24, also called coupling matrix, in each case connects or separates transmitting lines 15, 21 and receiving lines 14, 20 respectively of asynchronous, serial interface unit 13 and of CAN controller 12 with one another. In the receiving and transmitting mode through a corresponding program control, data is received or transmitted only through one interface at a time. Signal breakdown would otherwise not be ruled out in the transmitting mode and damage to the transmitting phases (not illustrated) might possibly occur. In the receiving mode, on the other hand, there is no danger of a mutual electrical interaction. In accordance with FIG. 1, connecting device 24 or coupling matrix has switching devices that facilitate an enabling or breaking of connection 24. The selection of the desired mode, i.e., a standard mode with discontinuous connecting device 24 in accordance with FIG. 1, or a symmetrical serial asynchronous interface data exchange mode via CAN driver 16 and connecting device 24 to asynchronous, serial interface unit 13 of microcontroller 11, takes place for example via microcontroller output 26 or an external control pin 25. This mode of operation is illustrated in FIG. 2 with conductive connecting device 24.

Connecting device 24 or coupling matrix may alternatively be implemented as a mechanical or electronic switch, through resistance bridges, with paste resistors that may be lasered through or via bond wire bridges. Production modifications of control device 10 with or without symmetrical serial asynchronous interface are consequently implementable on the basis of a comparable control unit hardware. In such a case with static connecting devices 24, which are not switchable, control by microcontroller 11 or from outside is not possible. The switching devices as connecting devices 24 are only necessary when data exchange is supposed to take place isochronously via asynchronous serial interface 23, e.g., an ISO9141 interface (K line), as well as via CAN bus 17, 18. On the other hand, if the data exchange does not run parallel in time, but in a staggered manner, such as for example, task- or interrupt-controlled, as is typically the case in control units for automotive applications, the switching devices may be omitted as connecting device 24 in accordance with FIGS. 1 through 3 and connecting device 24 or coupling matrix may be manufactured through a permanent electrically conductive connection, as explained above. In this case, care should be taken so that the identical, logical signal is applied to asynchronous serial interface 23 as well as to CAN interface 17, 18. Internal interface unit 12, 13 not used in each case correspondingly keeps quiet on the bus. The transmitting phase (not illustrated) of the inactive interface does not corrupt or interfere with the signal. If necessary, the output stage is reconfigured each time as a standard I/O port with the setting "input".

Figure 2:
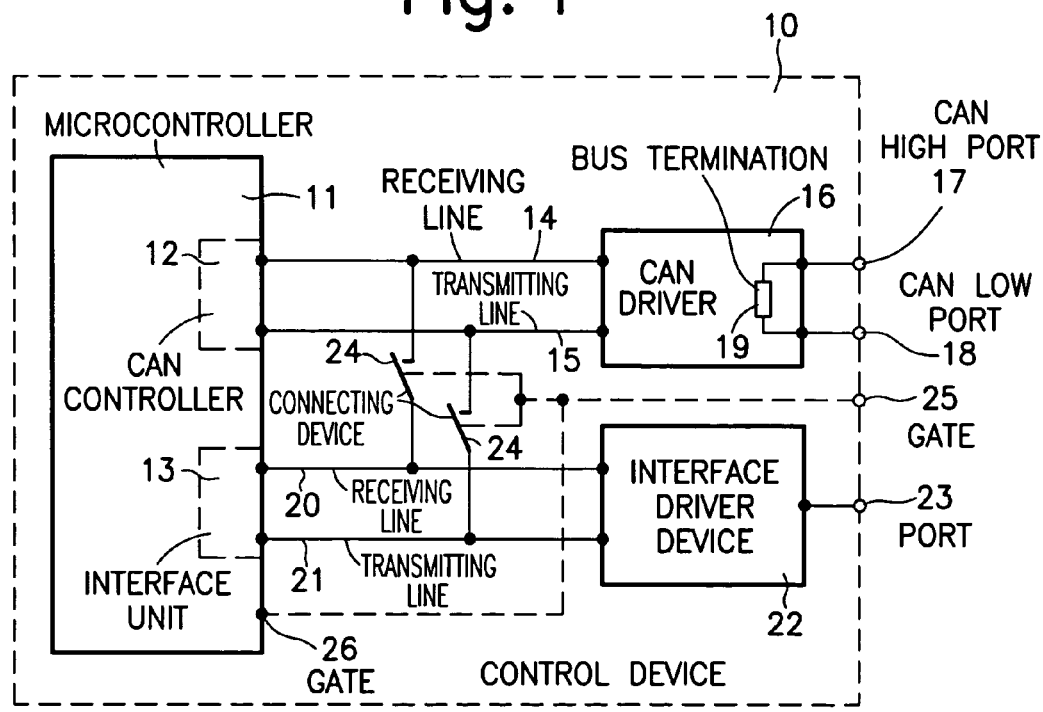
FIG. 2 shows a schematic block diagram to explain the function of the embodiment of the present invention.
Figure 3:
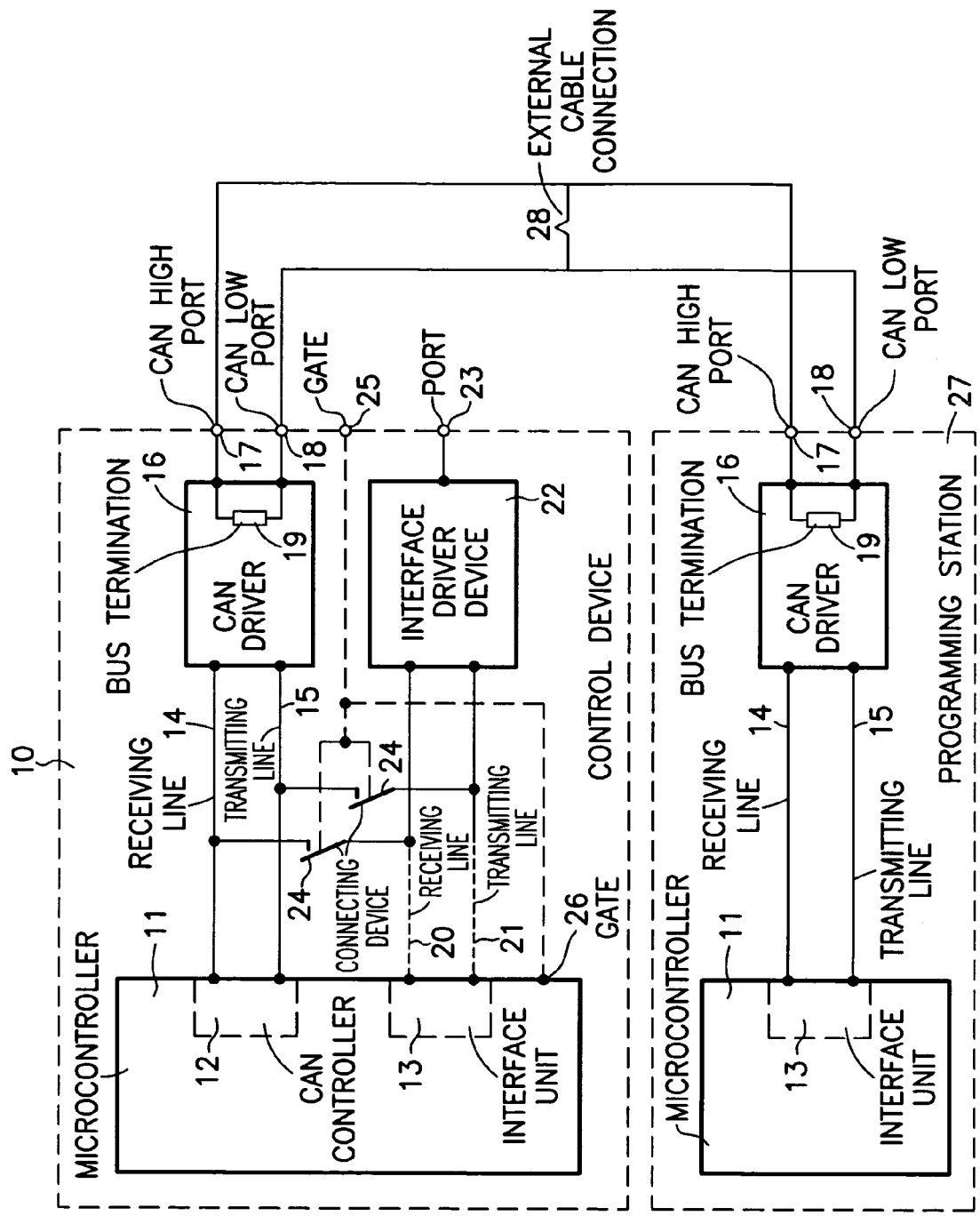
FIG. 3 shows a schematic block diagram to explain the function of the embodiment of the present invention.

External connecting devices 24 in accordance with FIGS. 1 through 3 may be omitted when microcontroller 11 has a possibility for internal connection of the signals of receiving lines 14, 20 or of transmitting lines 15, 21. In this case, it is possible for a separate pin to be provided on microcontroller 11 for every receiving line 14, 20 and transmitting line 15, 21 of both interface units 12, 13 and for the connection of corresponding transmitting lines 15, 21 or receiving lines 14, 20 to be implementable within the microcontroller. On the other hand, it is possible for the internal receiving or transmitting module of asynchronous, serial and of CAN interface unit 13, 12 to each share a physical pin of microcontroller 11 (not illustrated).

In this version, an isochronous data exchange may not take place via the asynchronous, serial interface, for example, ISO9141, and CAN interface 17, 18. The selection of the interface to be used each time preferably takes place via corresponding register settings, as a result of which the necessary interface multiplexing CAN/asynchronous serial interface is implementable.

The known asynchronous serial interface, for example ISO9141, continues to exist for a communication device 10 according to the present invention having a symmetrical asynchronous serial interface. A serial asynchronous interface-data exchange via CAN interface 17, 18 and corresponding driver 16, i.e., in the symmetrical asynchronous serial interface mode, may only follow if the remote terminal, for example programming station 27 in accordance with FIG. 3, is also symmetrically designed. Transmission protocols established in the automotive sector, such as for example KWP2000 (ISO 14230), may be used without any modification to the symmetrical asynchronous serial data exchange interface.

In FIG. 3, the use of the symmetrical asynchronous serial data exchange interface is illustrated as an example for a connection of a control device 10 to a programming station 27, in which control device 10 resembles the one described with reference to FIG. 1. Such a configuration in accordance with FIG. 3 appears in the data transmission for flash programming, for example. External cable connection 28 between corresponding CAN interfaces 17, 17; 18, 18 is preferably designed as a twisted pair with optional static screen in order to ensure the greatest possible signal-to-noise ratio.

Although the present invention was described above using preferred exemplary embodiments, it is not limited thereto, but is modifiable in many different ways.

Although described with reference to automotive applications, the present invention is basically applicable to any control devices with symmetrical and asymmetrical external interface. Moreover, the connecting devices explained are to be considered exemplary and not conclusive.

What is claimed is:

1. A communication device operating according to an asynchronous data transmission via a symmetrical serial interface, comprising:
    a microcontroller including a CAN controller and an asynchronous serial interface unit for receiving, processing, and outputting data;
    an asynchronous serial interface receiving line;
    an asynchronous serial interface transmitting line;
    an external asynchronous serial interface port;
    an asynchronous serial interface driver device for providing an asymmetrical data exchange with the microcontroller via the asynchronous serial interface unit, the asynchronous serial interface receiving line, the asynchronous serial interface transmitting line, and the external asynchronous serial interface port;
    a CAN receiving line;
    a CAN transmitting line;
    a plurality of external CAN ports;
    a CAN driver device for providing a symmetrical data exchange with the microcontroller via the CAN controller, the CAN receiving line, the CAN transmitting line, and the plurality of external CAN ports; and
    a connecting device arranged for selective connection between the CAN receiving line and the asynchronous serial interface receiving line, and arranged for selective connection between the CAN transmitting line and the asynchronous serial interface transmitting line for providing a symmetrical data exchange with the microcontroller via the asynchronous serial interface unit, the CAN driver device, and the plurality of external CAN ports.

2. The communication device as recited in claim 1, further comprising:
    a control device including an external pin, wherein: the connecting device includes a switching device that is selectively
    controllable via one of the external pin and an internal port of the microcontroller, depending on a program control.

3. The communication device as recited in claim 2, wherein:
    the program control is configured such that data may be one of received and transmitted only through one of the external asynchronous serial interface port and the plurality of external CAN ports at a time.

4. The communication device as recited in claim 1, wherein:
    the connecting device includes one of resistance bridges, paste resistors capable of being lasered through, and bond wires.

5. The communication device as recited in claim 1, wherein:
    a data exchange between an external device and the control device is one of task-controlled and interrupt-controlled.

6. The communication device as recited in claim 1, wherein:
    the connecting device is arranged within the microcontroller.

7. The communication device as recited in claim 1, wherein:
    the microcontroller includes a pin each for the asynchronous serial interface transmitting line, the asynchronous serial interface receiving line, the CAN transmitting line, and the CAN receiving line, and
    the connecting device in each case connects the asynchronous serial interface transmitting line, the CAN transmitting line, the asynchronous serial interface receiving line, and the CAN receiving line within the microcontroller.

8. The communication device as recited in claim 1, wherein:
    the microcontroller includes a first common pin for the CAN receiving line and the asynchronous serial interface receiving line,
    the microcontroller includes a second a common pin for the CAN transmitting line and the asynchronous serial interface transmitting line, and
    a selection of a desired interface being implementable via a register setting.

9. The communication device as recited in claim 1, wherein:
    the external asynchronous serial interface port includes a K line ISO9141 interface.

10. The communication device as recited in claim 1, wherein:
    the communication device is made up of a vehicle control unit.

* * * * *